(12) United States Patent
Yum et al.

(10) Patent No.: US 10,374,677 B2
(45) Date of Patent: Aug. 6, 2019

(54) METHOD FOR CHANNEL-RELATED FEEDBACK AND APPARATUS FOR SAME

(71) Applicant: LG ELECTRONICS INC., Seoul (KR)

(72) Inventors: Kunil Yum, Seoul (KR); Daesung Hwang, Seoul (KR); Kijun Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 15/524,253

(22) PCT Filed: Nov. 3, 2015

(86) PCT No.: PCT/KR2015/011721
§ 371 (c)(1),
(2) Date: May 3, 2017

(87) PCT Pub. No.: WO2016/072712
PCT Pub. Date: May 12, 2016

(65) Prior Publication Data
US 2017/0338877 A1    Nov. 23, 2017

Related U.S. Application Data

(60) Provisional application No. 62/093,415, filed on Dec. 18, 2014, provisional application No. 62/075,204, filed on Nov. 4, 2014.

(51) Int. Cl.
*H04L 5/00*     (2006.01)
*H04B 7/06*     (2006.01)
(Continued)

(52) U.S. Cl.
CPC ............. *H04B 7/0626* (2013.01); *H04B 7/04* (2013.01); *H04B 7/06* (2013.01); *H04B 7/0636* (2013.01);
(Continued)

(58) Field of Classification Search
CPC ........................... H04L 5/0048; H04L 5/0064
(Continued)

(56) References Cited

U.S. PATENT DOCUMENTS

2012/0093118 A1*   4/2012  Peters .................. H04L 1/0081
                                                              370/329
2013/0121309 A1    5/2013  Guo et al.
(Continued)

FOREIGN PATENT DOCUMENTS

WO        2014069944        5/2014

OTHER PUBLICATIONS

PCT International Application No. PCT/KR2015/011721, Written Opinion of the International Searching Authority dated Mar. 31, 2016, 19 pages.
(Continued)

*Primary Examiner* — Angel T Brockman
(74) *Attorney, Agent, or Firm* — Lee, Hong, Degerman, Kang & Waimey

(57) ABSTRACT

In a method for performing, by a rank-restricted terminal, a downlink channel-related feedback in a wireless communication system according to an embodiment of the present invention, the method includes the steps of: measuring a downlink channel; and feeding back information for improving a coverage on the basis of the measured downlink channel value, wherein the information for improving the coverage may include a repetition level indicator for improving the coverage.

14 Claims, 9 Drawing Sheets

(51) Int. Cl.
*H04B 7/04* (2017.01)
*H04B 17/318* (2015.01)
*H04B 17/24* (2015.01)

(52) U.S. Cl.
CPC ......... *H04B 17/318* (2015.01); *H04L 5/0091* (2013.01); *H04B 17/24* (2015.01); *H04L 5/0048* (2013.01); *H04L 5/0053* (2013.01); *H04L 5/0064* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0308572 A1 | 11/2013 | Sayana et al. | |
| 2014/0098761 A1* | 4/2014 | Lee ..................... | H04W 74/006 370/329 |
| 2015/0155999 A1* | 6/2015 | Gao ..................... | H04L 1/0026 370/329 |

OTHER PUBLICATIONS

Huawei, "Measurements and reporting for configuring coverage enhancements", 3GPP TSG RAN WG1 Meeting #78b, R1-144329, Oct. 2014, 6 pages.

* cited by examiner (a)

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| W1 | | WB W2, CQI PTI=0 | | WB W2, CQI PTI=0 | | WB W2, CQI PTI=0 | | W1 | | WB W2, CQI PTI=0 | | WB W2, CQI PTI=0 | | WB W2, CQI PTI=0 | | W1 | ... |

FIG. 11

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| WB W2, CQI PTI=1 | | SB W2, CQI L | | SB W2, CQI L | | SB W2, CQI L | | WB W2, CQI PTI=1 | | SB W2, CQI L | | SB W2, CQI L | | SB W2, CQI L | | WB W2, CQI PTI=1 | ... |

METHOD FOR CHANNEL-RELATED FEEDBACK AND APPARATUS FOR SAME

CROSS-REFERENCE TO RELATED APPLICATIONS

This application is the National Stage filing under 35 U.S.C. 371 of International Application No. PCT/KR2015/011721, filed on Nov. 3, 2015, which claims the benefit of U.S. Provisional Application No. 62/075,204, filed on Nov. 4, 2014, and 62/093,415, filed on Dec. 18, 2014, the contents of which are all hereby incorporated by reference herein in their entirety.

TECHNICAL FIELD

The present invention relates to a wireless communication system, and more particularly, to a method and apparatus for channel-related feedback of a rank-limited terminal.

BACKGROUND ART

Various techniques including Machine-to-Machine (M2M) communication and various devices requiring a high data rate, e.g., smartphones and tablet Personal Computers (PCs), have emerged and gained popularity. As a consequence, the amount of data to be processed in a cellular network is rapidly increasing. To satisfy such rapidly increasing data processing requirements, Carrier Aggregation (CA), cognitive radio, etc. for efficiently using a larger number of frequency bands, Multiple Input Multiple Output (MIMO), Coordinated Multipoint transmission and reception (CoMP), etc. for increasing the amount of data transmitted in limited frequency bands have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicates with a UE using the same time-frequency resources offers a higher throughput than a conventional communication scheme in which each node operates as an independent base station (BS) and communicates with a UE without cooperation with other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated at a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as a MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may be satisfactorily performed with uniform quality irrespective of the locations of UEs within a cell. Furthermore, the multi-node system boasts reduced signal loss during transmission because BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

An object of the present invention devised to solve the problem is to provide a method for channel-related feedback for more efficient channel status reporting and proper corresponding scheduling.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for performing reporting of information for coverage enhancement by a rank-limited terminal in a wireless communication system, the method including receiving a reporting configuration of the information for coverage enhancement, measuring a downlink channel according to the reporting configuration, and reporting the information for coverage enhancement based on a value of the measured downlink channel, wherein the information for coverage enhancement includes a repetition level indicator for coverage enhancement.

Additionally or alternatively, the information for coverage enhancement may be transmitted in an instance for transmission of a rank indicator configured for the terminal.

Additionally or alternatively, the information for coverage enhancement may include a repetition level indicator for downlink and a repetition level indicator for uplink.

Additionally or alternatively, the information for coverage enhancement may include a repetition level indicator for an individual physical channel.

Additionally or alternatively, the repetition level indicator may include a repetition level for coverage enhancement or a repetition level offset for coverage enhancement.

Additionally or alternatively, the information for coverage enhancement may have a higher priority than channel state information to be reported by the terminal.

Additionally or alternatively, reporting of channel state information may be dropped when the reporting of the information for coverage enhancement conflicts with reporting of the channel state information.

Additionally or alternatively, the method may further include receiving downlink data transmitted using a coverage enhancement technique according to the information for coverage enhancement.

Additionally or alternatively, a report of the information for coverage enhancement may be transmitted in a measurement report on a reference signal received power (RSRP) or a reference signal received quality (RSRQ).

In another aspect of the present invention, provided herein is a rank-limited terminal configured to perform reporting of information for coverage enhancement, the terminal including a radio frequency (RF) unit, and a processor configured to control the RF unit, wherein the processor is configured to receive a reporting configuration of the information for coverage enhancement, to measure a downlink channel according to the reporting configuration, and to feed back the information for coverage enhancement determined based on a value of the measured downlink channel, wherein the information for coverage enhancement may include a repetition level indicator for coverage enhancement.

Additionally or alternatively, the information for coverage enhancement may be transmitted in an instance for transmission of a rank indicator configured for the terminal.

Additionally or alternatively, the information for coverage enhancement may include a repetition level indicator for downlink and a repetition level indicator for uplink.

Additionally or alternatively, the information for coverage enhancement may include a repetition level indicator for an individual physical channel.

Additionally or alternatively, the repetition level indicator may include a repetition level for coverage enhancement or a repetition level offset for coverage enhancement.

Additionally or alternatively, the information for coverage enhancement may have a higher priority than channel state information to be reported by the terminal.

Additionally or alternatively, reporting of channel state information may be dropped when reporting of the information for coverage enhancement conflicts with reporting of the channel state information.

Additionally or alternatively, the processor may be configured to receive downlink data transmitted using a coverage enhancement technique according to the information for coverage enhancement.

Additionally or alternatively, a report of the information for coverage enhancement may be transmitted in a measurement report on a reference signal received power (RSRP) or a reference signal received quality (RSRQ).

The above technical solutions are merely some parts of the embodiments of the present invention and various embodiments into which the technical features of the present invention are incorporated can be derived and understood by persons skilled in the art from the following detailed description of the present invention.

Advantageous Effects

In accordance with an embodiment of the present invention, channel-related feedback of a rank-limited terminal is possible, and unnecessary transmission instances may be utilized for other channel-related feedback, thereby enabling more efficient channel-related feedback and resource use.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 shows a feedback instance and reported information according to an embodiment of the present invention;

FIG. 11 shows a feedback instance and reported information according to an embodiment of the present invention;

BEST MODE

Figure 1:
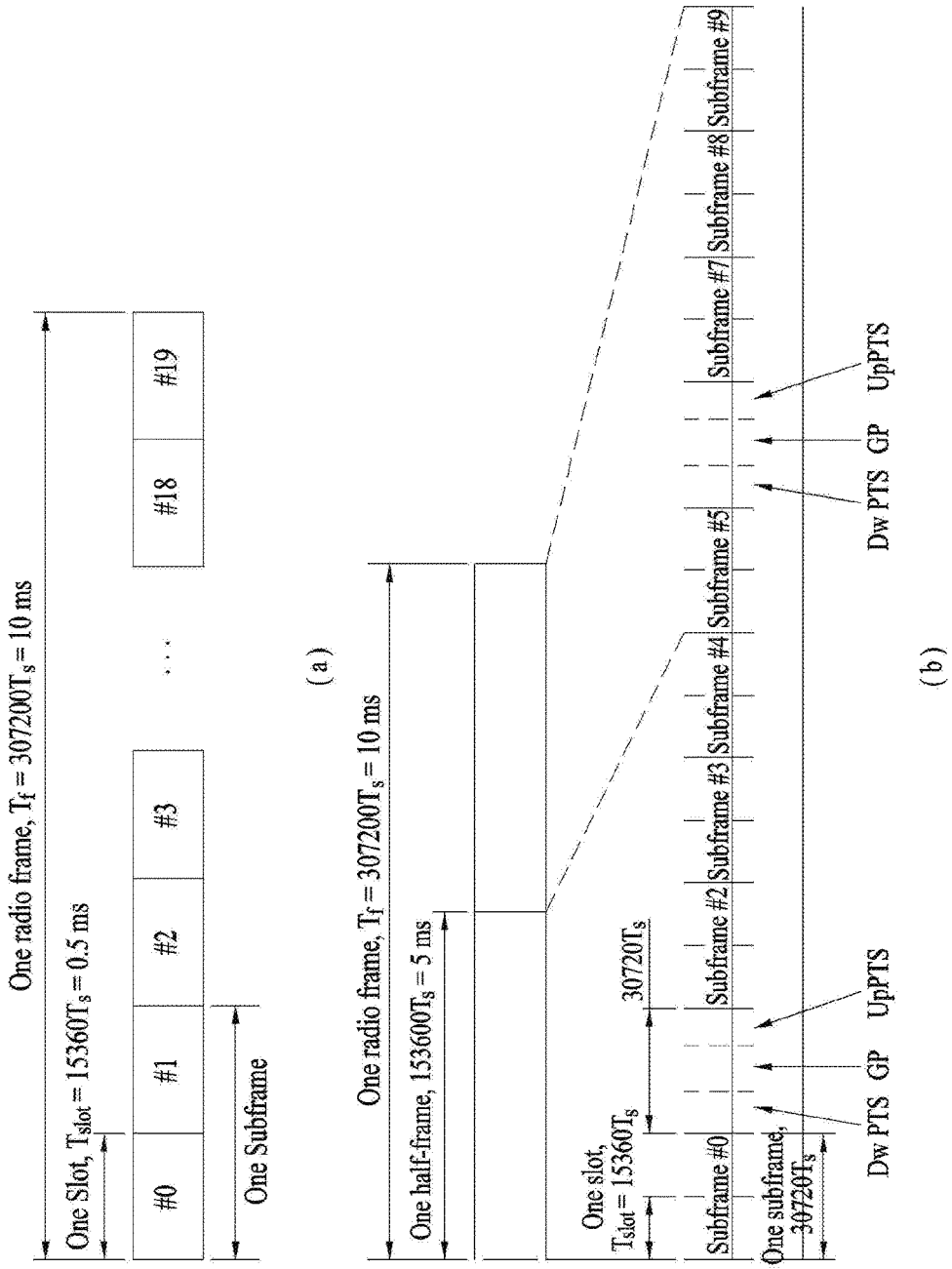
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (1-DD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
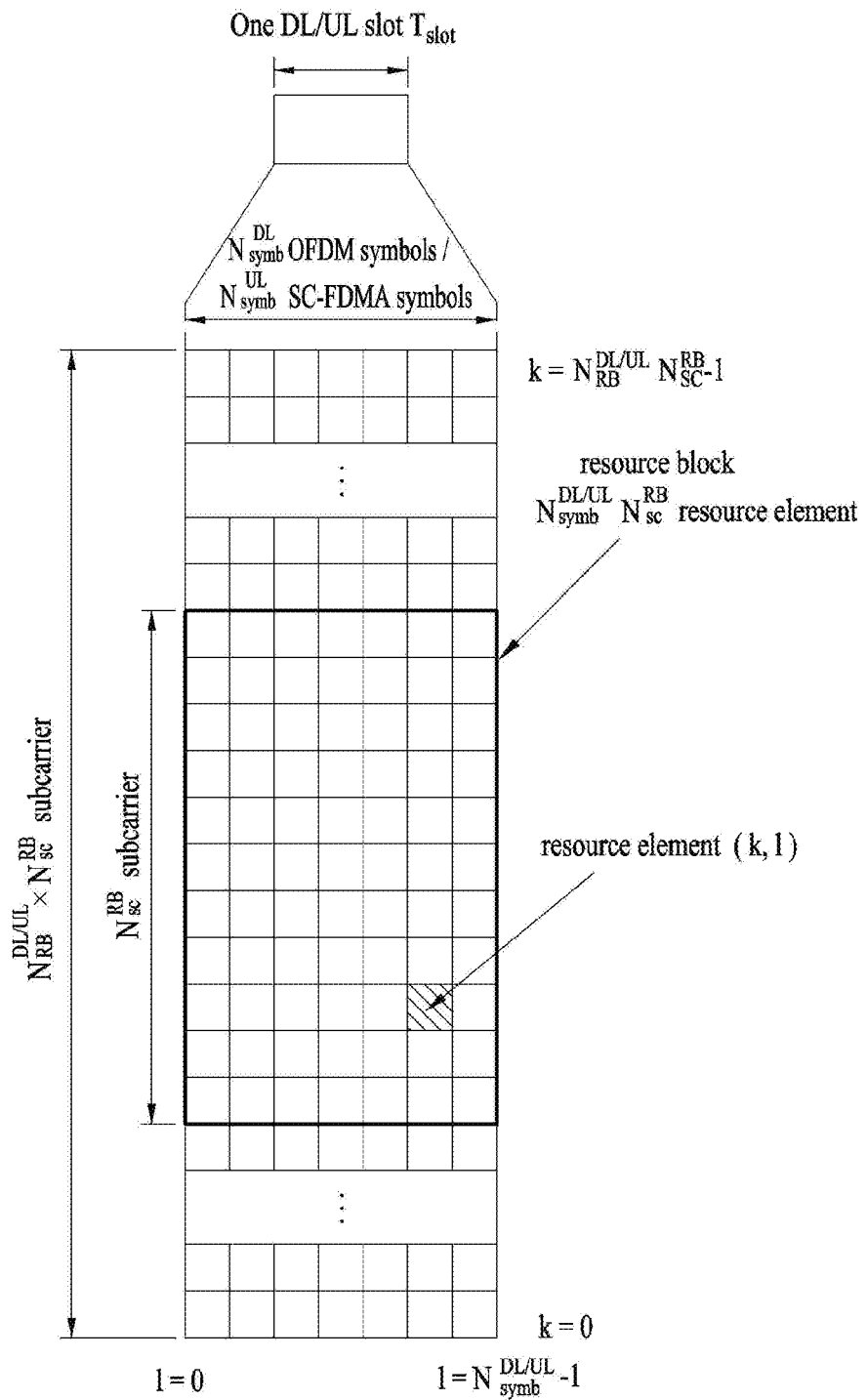
FIG. 2 is a diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $NL_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
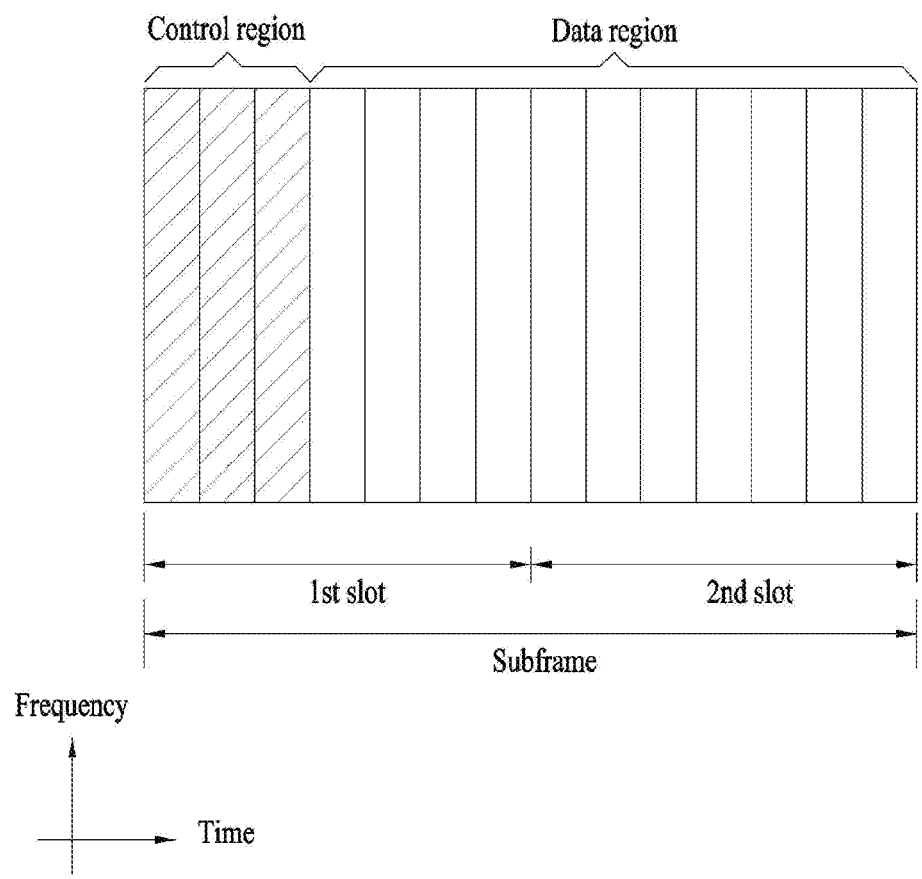
FIG. 3 is a diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
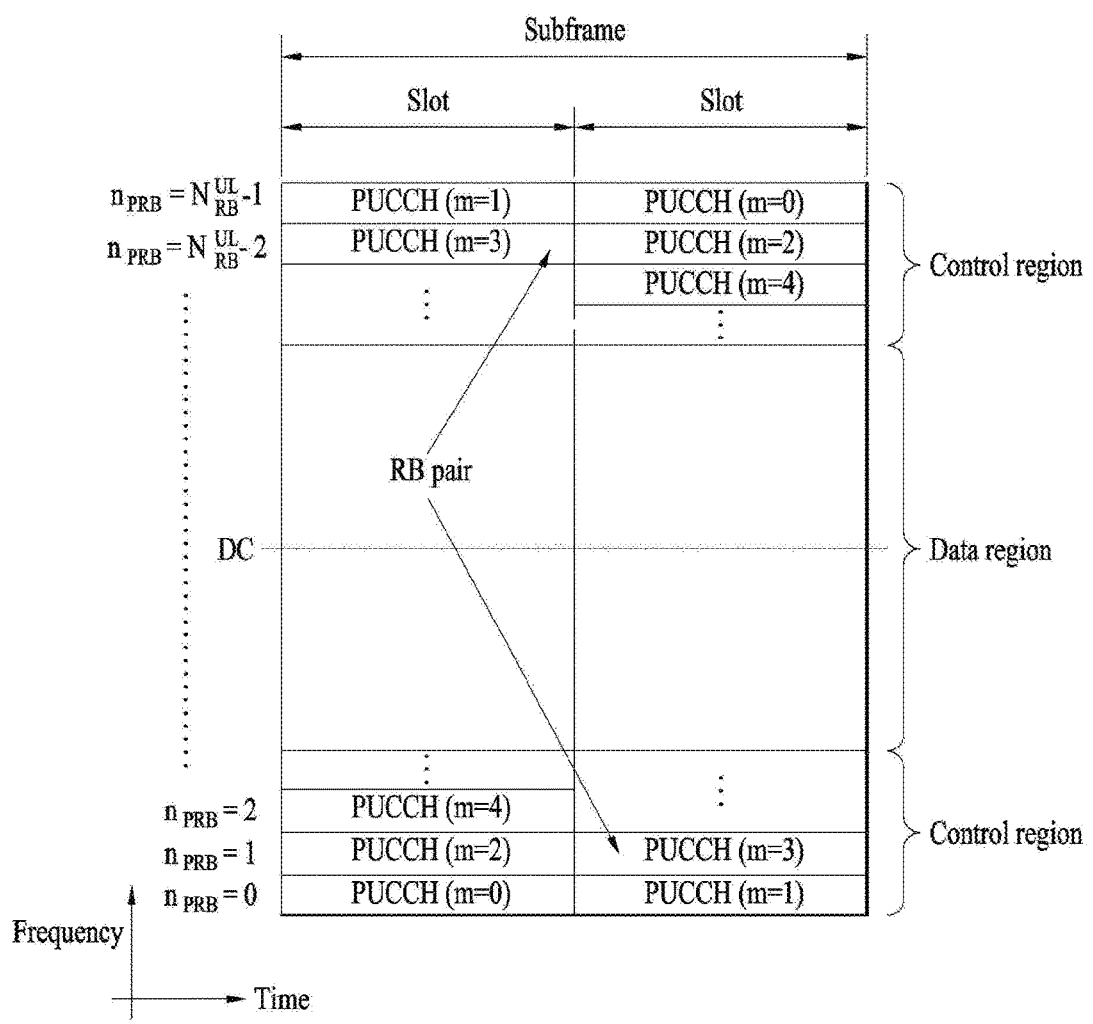
FIG. 4 is a diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-1-DMA symbols available for control information transmission. The SC-1-DMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
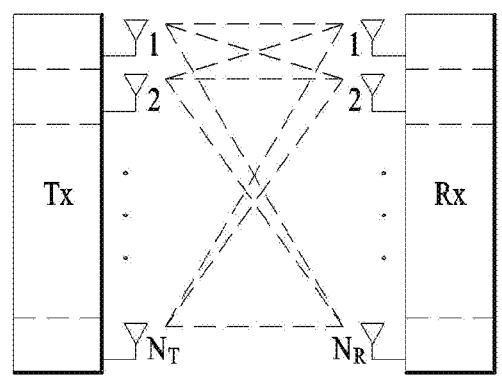
FIG. 5 shows a block diagram of Multiple Input Multiple Output (MIMO) used in a 3GPP LTE/LTE-A system.
Figure 5:
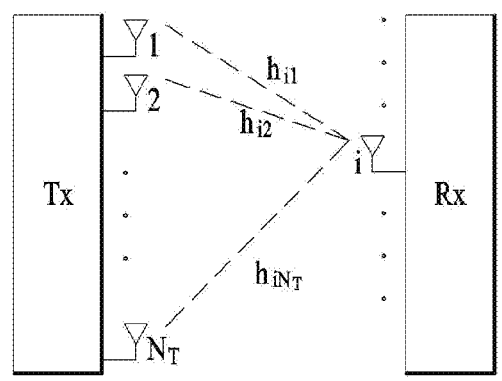

FIG. 5 shows the configuration of a wireless communication system including multiple antennas.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \qquad \text{[Equation 2]}$$

Individual transmission information pieces $S_1, S_2, \ldots, S_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

In the meantime, the information vector Ŝ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_x}$ may be represented as the following vector.

$$y = [y_1, y_2, \ldots, y_{N_R}]^T$$ [Equation 6]

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}]$$ [Equation 7]

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T$$ [Equation 9]

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$ [Equation 10]

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R)$$ [Equation 11]

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-Based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
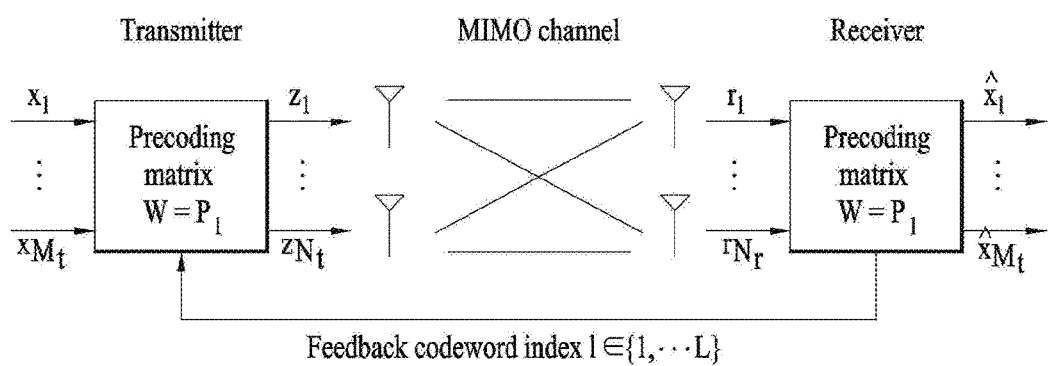
FIG. 6 illustrates codebook-based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{(s)}$ is obtained with a set $\{s\}$ configured by an equation expressed as $W_n = I - 2u_n u_n^H / u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 7

| Scheduling scheme | Periodic CSI transmission | Aperiodic CSI transmission |
| --- | --- | --- |
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | | PMI Feedback Type | | |
| --- | --- | --- | --- | --- |
| | | No PMI | Single PMI | Multiple PMIs |
| PUSCH CQI Feedback Type | Wideband (Wideband CQI) | | | Mode 1-2 RI 1st wideband CQI (4 bit) 2nd wideband CQI (4 bit) if RI > 1 N * Subband PMI (4 bit) (N is the total # of subbands) (if 8Tx Ant, N * subband W2 + wideband W1) |

TABLE 8-continued

| | PMI Feedback Type | | |
|---|---|---|---|
| | No PMI | Single PMI | Multiple PMIs |
| UE selected (Subband CQI) | Mode 2-0<br>RI (only for Open-loop SM)<br>1st wideband CQI (4 bit) + Best-M CQI (2 bit)<br>(Best-M CQI: An average CQI for M SBs selected from among N SBs)<br>Best-M index (L bit) | | Mode 2-2<br>RI<br>1st wideband CQI (4 bit) + Best-M CQI (2 bit)<br>2nd wideband CQI (4 bit) + Best-M CQI (2 bit) if RI > 1<br>Best-M index (L bit)<br>Wideband PMI (4 bit) + Best-M PMI (4 bit)<br>(if 8Tx Ant, wideband W2 + Best-M W2 + wideband W1) |
| Higher Layer-configured (Subband CQI) | Mode 3-0<br>RI (only for Open-loop SM)<br>1st wideband CQI (4 bit) + N * subband CQI (2 bit) | Mode 3-1<br>RI<br>1st wideband CQI (4 bit) + N * subbandCQI (2 bit)<br>2nd wideband CQI (4 bit) + N * subbandCQI (2 bit) if RI > 1<br>Wideband PMI (4 bit)<br>(if 8Tx Ant, wideband W2 + wideband W1) | Mode 3-2<br>RI<br>1st wideband CQI (4 bit) + N * subbandCQI (2 bit)<br>2nd wideband CQI (4 bit) + N * subbandCQI (2 bit) if RI > 1<br>N * Subband PMI (4 bit)<br>(N is the total # of subbands)<br>(if 8Tx Ant, N * subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

| | | PMI feedback type | |
| --- | --- | --- | --- |
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

Figure 9:
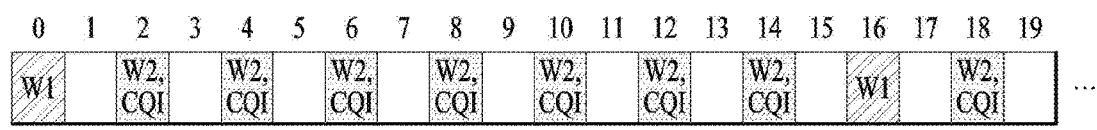
FIG. 9 shows a feedback instance and reported information according to an embodiment of the present invention.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Improving or Enhancing Machine Type Communication (MTC) Coverage

TTI Bundling, HARQ Retransmission, Repetition, Code Spreading, RLC Splitting, Low Rate Coding, Low Modulation Order, New Decoding Technology More energy may be accumulated to improve coverage by increasing transmission time. TTI bundling HARQ retransmissions on existing data channels are effective for coverage enhancement. Since the maximum number of current UL HARQ retransmissions is 28 and TTI bundling is possible for up to four consecutive subframes, TTI bundling with a larger TTI bundling size may be extended to achieve better performance. Unlike TTI bundling and HARQ retransmission, repetition (transmission) may be applied by repeating the same or different redundancy version (RV) multiple times. In addition, code spreading in the time domain may also be considered for coverage enhancement. The MTC traffic packets may be RLCs divided into smaller packets. For these packets, very low rate coding, lower modulation order (BPSK) and cyclic redundancy check (CRC) bits of a shorter length may be used. The new decoding technology (e.g., correlation or reduced search space decoding) may also improve coverage by taking into account the characteristics of a particular channel (e.g., channel period, rate of parameter change, channel structure, limited content, etc.) and eased performance requirements (e.g., delay tolerance).

Power Boosting/Power Spectral Density (PSD) Boosting

More power may be used for DL transmission to the MTC terminal (i.e., power may be boosted), or a power of a given level may be concentrated at the reduced bandwidth at the eNB or the terminal (i.e., PSD boosting). The application of power boosting or PSD boosting will depend on the channel or signal considered.

In the following description, "MTC terminal" may be referred to as "MTC UE," "MTC type terminal," "MTC type UE" or "terminal."

Eased Requirements

Performance requirements (e.g., greater delay tolerance) for particular channels may be eased in view of the characteristics of the MTC UE in poor scenarios. For the synchronization signal, the MTC UE may accumulate energy by combining the PSS or SSS several times, but it will take a long time to acquire the energy. For the PRACH, an eased PRACH detection threshold rate and a higher failure alarm rate may be considered at the eNB.

New Channels or Signals

If the implementation-based schemes cannot meet the requirements for coverage enhancement, a new design of channels or signals for better coverage is possible. These channels and signals may be summarized as shown in the table below.

Small Cell for Improved Coverage

Coverage enhancement using link enhancement should be provided by the operator for scenarios where small cells are not deployed. The operator may provide conventional solutions for coverage enhancement using small cells (e.g., picocell, femtocell, RRH, relay, repeater, etc.) to provide coverage enhancements for MTC and non-MTC UEs. In deployment through small cells, path loss from a UE to the nearest cell may be reduced. As a result, for MTC UEs, the required link budget may be reduced for all channels. Depending on the small cell location/density, a small improvement in coverage may still be required.

For deployments involving small cells, there may be an advantage of allowing decoupling of UL and DL for delay tolerant MTC UEs. For UL, an optimal serving cell is selected based at least on the coupling loss. For DL, due to the Tx power imbalance (including antenna gain) between the macrocell and the LPN, the optimal serving cell is one with the maximum receive signal power. This UL/DL decoupling relationship is possible for MTC traffic for services without strict delay requirements. To enable UL/DL decoupling operations in the UE-transparent or non-transparent scheme, macrocells and potential LPNs need to exchange information about configuration of channels (e.g., RACH, PUSCH, SRS) and to identify appropriate LPNs. Other RACH configurations may be needed for decoupled UL/DL.

Additional Technology

Existing solutions deployed for coverage enhancement for "typical LTE UEs" such as directional antennas and external antennas may improve coverage for MTC UEs and typical UEs. An additional improvement to the solution for improving MTC UE coverage using specific MTC UE application features is not excluded.

The following table lists link-level solutions for improving the coverage of various physical channels.

TABLE 10

| | PSS/SSS | PBCH | PRACH | (E)PDCCH | PDSCH/PUSCH | PUCCH |
|---|---|---|---|---|---|---|
| PSD boosting | X | X | X | X | X | |
| Eased requirements | X | | X | | | |
| New channel/signal design | X | X | X | X | X | |
| Repetition (of transmission) | | X | X | X | X | X |
| Low rate coding | | X | | X | X | X |
| TTI bundling/retransmission | | | | | X | |
| Spreading | | X | | | X | |
| RS power boosting/increased RS density | | X | | X | X | |
| New decoding technology | | X | | | | |

In the present invention, there is provided a method for CSI feedback for transmitting PMI and CQI without feedback of RI when there is a UE such as an MTC UE having only one RF chain in the wireless communication system and the UE can perform communication only on a specific rank.

In the next generation system such as LTE-A, it is considered to construct a low-cost/low-specification UE mainly focusing on data communication for, for example, meter reading, water level measurement, surveillance cameras, and inventory reporting of a vending machine. Such UEs are collectively referred to as MTC (Machine Type Communication) UEs for simplicity. For the MTC UE, since the amount of data to be transmitted is small and uplink/downlink data transmission/reception occurs infrequently, it is effective to reduce UE cost and battery consumption according to the low data transmission rate. As a method for addressing this issue, it is considered to limit the number of RF chains of the MTC UE to one. In this case, the UE may satisfy the required data rate for the MTC UE while reducing the burden on processing and reducing the cost and battery consumption.

A typical wireless communication UE transmits channel information for transmission channel measurement to an eNB, and the eNB mainly allocates resources to this UE and configures a modulation and coding scheme (MCS) based on the channel information. In this case, the UE transmits three types of information as channel information, namely RI, PMI, and CQI.

In the UE, the RI is an index indicating a transmission rank, which means the number of data streams that can be transmitted at the same time. In this case, the maximum number of physical ranks may be represented by min (number of transmit antenna ports, number of receive antenna ports). In LTE-A, up to 8 transmit antenna ports/8 receive antenna ports are assumed. Accordingly, technological development in LTE-A is under way on the assumption of a maximum rank of 8.

However, the MTC UE has a single RF chain, which has an effect of limiting the maximum transmission rank of the MTC UE to one. Therefore, instead of measuring/transmitting the rank, the MTC UE may calculate and transmit a CQI/PMI assuming that the rank is 1, and the eNB may use the PMI and CQI obtained on the assumption that the rank is 1 for resource allocation and MCS determination of the MTC UE.

In the LTE standard, the bit width required for RI feedback is defined as follows.

TABLE 11

| | | Bit width | | | | |
|---|---|---|---|---|---|---|
| | 2 | 4 Antenna ports | | 8 Antenna ports | | |
| Field | Antenna ports | Up to 2 layers | Up to 4 layers | Up to 2 layers | Up to 4 layers | Up to 8 layers |
| Rank indicator (RI) | 1 | 1 | 2 | 1 | 2 | 3 |

In the case of a rank-limited MTC UE fixed to the rank of 1, no specific indicator is required to indicate the rank. Therefore, the RI bit width may be defined as follows.

TABLE 12

| | | Bit width | | | | | |
|---|---|---|---|---|---|---|---|
| | 2 | 4 Antenna ports | | 8 Antenna ports | | | LC- |
| Field | Antenna ports | Up to 2 layers | Up to 4 layers | Up to 2 layers | Up to 4 layers | Up to 8 layers | MTC UE |
| Rank indicator (RI) | 1 | 1 | 2 | 1 | 2 | 3 | 0 |

Therefore, the RI feedback bits for the LC-MTC UE are defined as 0 bits, and the RI is transmitted using 0 bits in the aperiodic/periodic CSI report. That is, in aperiodic CSI transmission, the RI is not transmitted. In addition, there may be a case where event-trigger CSI feedback is configured for the MTC UE. In this case, the MTC UE performs specific CSI feedback in a subframe satisfying a specific condition in such a manner that specific CSI is greater than or equal to a predetermined threshold value. In this case, the RI is transmitted using the RI bit width, and therefore the MTC UE may not perform RI feedback in an instance that feeds back the RI if the rank of CSI feedback for the rank-limited UE is fixed to 1. Alternatively, in the same situation, the MTC UE may not determine whether or not to perform RI feedback in the RI feedback instance, nor may it perform RI transmission. In both example modes, it is preferable that the UE not even perform the RI calculation.

However, in the case of periodic CSI transmission, transmission of RI is performed using a predefined periodic RI container when the eNB makes a request for the PMI/RI report to the MTC UE. In the LTE-A system, a transmission instance for RI feedback is defined for feedback of channel information as follows.

$$(10 \times n_f + [n_s/2] - N_{OFFSET,CQI} - N_{OFFSET,RI}) \bmod (N_{pd} \cdot M_{RI}) = 0 \quad \text{Equation 12}$$

That is, transmission of the RI is performed with a period equal to the $M_{RI}$ times the PMI/CQI transmission period $N_{pd}$ and a subframe offset equal to $N_{OFFSET,CQI} + N_{OFFSET,RI}$. $N_{pd}$ and $M_{RI}$ for determining the transmission period, and $N_{OFFSET,CQI}$ and $N_{OFFSET,RI}$ for determining the transmission offset are determined by $I_{RI}$ and $I_{CQI/PMI}$, which are transmitted through higher layer signaling.

Figure 7:
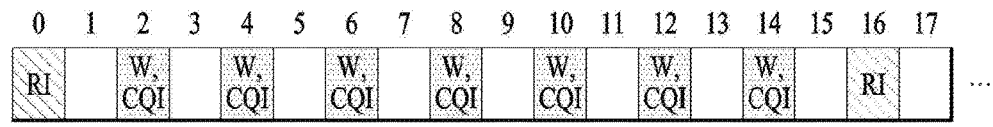
FIG. 7 shows a feedback instance and reported information according to a specific feedback mode in 3GPP LTE(-A)
Figure 8:
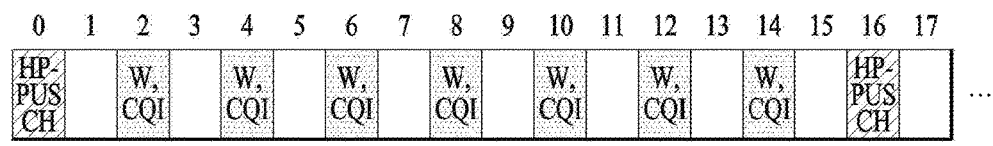
FIG. 8 shows a feedback instance and reported information according to an embodiment of the present invention.

FIG. 7 illustrates feedback mode 1-1 when $N_{pd}$=2 and $M_{R1}$=8. The RI is transmitted using feedback type 3, and the (wideband) PMI W and the CQI are transmitted using feedback type 2. The remaining subframes, which are indicated by a blank, may be used for other purposes such as scheduling request and transmission of HARQ ACK/NACK, or PUSCH. In this case, RI, W, and CQI transmission instances overlap in subframes 0 and 16, and thus RI is transmitted with W and CQI dropped.

Characteristics of resources used for RI transmission include long transmission period and high priority transmission. The transmission period increases by $M_{RI}$ times the CQI/PMI transmission period $N_{pd}$ as described above and is long. The priority of the RI is lower than those of the scheduling request and HARQ ACK/NACK, and is higher than that of PMI/CQI transmission. That is, when RI transmission is triggered together with the scheduling request and the HARQ ACK/NACK transmission instance, the RI is dropped and the scheduling request and the HARQ ACK/NACK are transmitted. In the case where RI transmission is triggered together with the PMI/CQI transmission instance, the PMI/CQI or PUSCH is dropped, and the RI is transmitted.

The MTC UE may be subjected to a rank restriction due to limitations of UE performance and the like. In this case, the MTC UE may explicitly or implicitly inform the eNB of whether rank restriction is needed for the UE, through, for example, higher layer signaling. The eNB uses the information to determine whether the UE is to feed back the RI and to indicate whether or not the UE should feed back the RI through, for example, higher layer signaling.

If RI transmission is not performed, the resources which have been used to feed back the RI using the feedback type 3 (RI) or feedback type 5 (RI+W1) may be used for other purposes. There are several methods to use the resources.

First Method: Maintaining RI Instance

The resource used for RI transmission is preserved, but is used for other purposes. In this case, the parameters of the RI transmission resource are used to apply the characteristics of the resource (for example, high priority, long term period, etc.).

Method 1-1: High-Priority PUSCH Transmission

The MTC UE may transmit the PUSCH in an RI instance. The PUSCH is transmitted with a higher priority than CQI/PMI transmission as in the case of the RI resource, and therefore if the PUSCH shares the same resource with CQI/PMI transmission, the CQI/PMI will be dropped and the PUSCH with higher priority will be transmitted. The MTC UE may transmit general data through the higher priority PUSCH or may use the PUSCH to transmit essential data which is to be transmitted at a specific interval in a manner of, for example, piggybacking. For example, the higher-priority PUSCH may be used as a container of large capacity HARQ ACK/NACK, or may be fed back in a format such as aperiodic CSI (e.g., subband CQI). In this case, the MTC UE needs to obtain a scheduling grant and resource allocation for periodic transmission of the PUSCH with high priority.

Method 1-2: Feeding Back Other CSI Information (e.g., W1)

The MTC UE may feed back CSI information instead of the RI in the instance which has been used to transmit the RI. In this case, since the CSI has the characteristics of the RI instance (or resource), it is transmitted with a longer period and a higher priority than the other CSIs.

The current LTE-A standard defines the following priorities for the CSIs. For example, if CSI reporting of PUCCH report type 3, 5 or 6 of a serving cell conflicts with PUCCH report type 1, 1a, 2, 2a, 2b, 2c or 4 of the serving cell, CSI reporting of PUCCH report type 1, 1a, 2, 2a, 2b, 2c or 4 has lower priority and is thus dropped.

The PUCCH report types are described below.
Type 3: RI
Type 5: RI+WB W1
Type 6: RI+PTI,
Type 1: SB (sub-band) CQI,
Type 2: WB (wideband) CQI+WB PMI
Type 4: WB CQI
Type 1a: SB CQI+SB W2
Type 2b: WB CQI+WB W2
Type 2c: WB W1+WB W2+WB CQI
Type 2a: WB W1

That is, long-term feedback has higher priority than short-time feedback.

That is, the long-time feedback represented by the RI has a higher priority than the other short time feedback. However, if there is no feedback of RI, defining the priority levels may be meaningless. That is, if RI transmission is deactivated and Method 1-2 is used, it is possible to redefine the priorities among the remaining feedbacks after removing the RI as below to determine a CSI to be dropped when the transmission instances of the respective CSIs overlap. For example, the following method may be used.

Long Term PMI>Short Term PMI/CQI
Namely,
Type 2a: WB W1
Regarding:
Type 1: SB CQI
Type 2: WB CQI+WB PMI
Type 1a: SB CQI+SB W2
Type 2b: WB CQI+WB W2
Type 2c: WB W1+WB W2+WB CQI
Type 4: WB CQI
Type 2a has higher priority than Type 1, 1a, 2, 2b, 2c, and 4.

Therefore, when there is no RI transmission and Method 1-2 is used, the UE transmits WB W1 (type 2a) in the RI transmission instance using the above priority relationship, and if the transmission instance overlaps the transmission instance of another feedback type CSI, WB W1 may be transmitted with the other CSI dropped. FIG. 9 shows a feedback mode according to Method 1-2.

Method 1-3: Feeding Back Information Other than CSI in RI Instance

The MTC UE may feed back other information instead of the RI in the instance for transmitting the RI. For example, the MTC UE may transmit information about the coverage enhancement requirement/statistics. The MTC UE may periodically estimate the coverage enhancement requirement for downlink and/or uplink through periodic measurement, and may periodically transmit the corresponding information to the network. Since mobility of the MTC UE is limited, it may be expected that the frequency of change of the coverage enhancement requirement or the required coverage enhancement level will not be high. Therefore, the MTC UE may report the coverage enhancement level to the network with the relatively long period of transmission of RI.

That is, the MTC UE may transmit, in a container for 3 bits allocated to the RI, a repetition level indicator (RLI) which the UE requests that the eNB use on downlink or which is to be applied on uplink. For example, when the MTC UE desires to change the repetition level for downlink, it may send RLI=101 to request a repetition level at which the coverage enhancement of 5 dB may be achieved, and the eNB may use the requested repetition level for the corresponding downlink/uplink. Alternatively, the MTC UE may indicate uplink or downlink using one of the three bits (for example, 0=uplink and 1=downlink), and use the remaining 2 bits to indicate the repetition level for the corresponding downlink/uplink.

Alternatively, the RLI may be transmitted by transmitting an index of a table transmitted from the eNB to the MTC UE or vice versa through predefined signaling or signaling such as RRC. When the repetition level of the downlink is to be changed, a repetition level table may be defined as shown in the following table, and the MTC UE may transmit RLI=101 to signal a repetition level corresponding to 12 dB on downlink

TABLE 13

| RLI | Repetition Level (dB) |
|---|---|
| 0 | 0 |
| 1 | 3 |
| 2 | 5 |
| 3 | 7 |
| 4 | 10 |
| 5 | 12 |
| 6 | 15 |
| 7 | 18 |

Alternatively, the MTC UE may simultaneously transmit the information about downlink and information about uplink. If the information about the downlink/uplink is to be directly uploaded, the container of all 3 bits may be divided into a container for downlink and a container for uplink. For example, the container may be divided into 2 bits for downlink and 2 bits for uplink, and RLI=101 may be transmitted. Thereby, a repetition level index of 2 may be signaled for downlink and a repetition level index of 1 may be signaled for uplink.

In another method, a table for downlink/uplink may be defined, and an index indicating the corresponding repetition level may be transmitted. If the repetition level for the RLI is defined as shown in the table below, the MTC UE may signal, to the eNB, 5 dB as the repetition level for downlink and 10 dB as the repetition level for uplink by transmitting RLI=101.

TABLE 14

| RLI | Repetition level for downlink | Repetition level for uplink |
|---|---|---|
| 0 | 0 | 0 |
| 1 | 5 | 0 |
| 2 | 0 | 5 |
| 3 | 5 | 5 |
| 4 | 10 | 5 |
| 5 | 5 | 10 |
| 6 | 10 | 10 |
| 7 | 18 | 18 |

The table for RLI given above may be defined for each channel.

TABLE 15

| RLI | Repetition level for PDCCH | Repetition level for PDSCH | Repetition level for PUCCH | Repetition level for PUSCH |
|---|---|---|---|---|
| 0 | 0 | 0 | 0 | 0 |
| 1 | 5 | 0 | 5 | 0 |
| 2 | 5 | 5 | 5 | 5 |
| 3 | 10 | 5 | 10 | 5 |
| 4 | 10 | 10 | 10 | 10 |
| 5 | 15 | 10 | 15 | 10 |
| 6 | 15 | 15 | 15 | 15 |
| 7 | 18 | 18 | 18 | 18 |

In this case, the MTC UE may transmit RLI=101 to signal to the eNB a repetition level of 15 dB for the PDCCH, a repetition level of 10 dB for the PDSCH, a repetition level of 15 dB for the PUCCH, and a repetition level of 10 dB for the PUSCH.

The table indicating the degree of coverage enhancement may be preconfigured or may be determined according to the maximum coverage enhancement level set by the network. For example, when the maximum coverage enhancement level set by the network is 15 dB, the following table may be considered. In this table, the level of coverage enhancement required by each index may vary depending on the maximum coverage level that the system provides. Of course, the network may set the maximum coverage levels for DL and UL separately.

TALBE 16

| RLI | Repetition level for downlink | Repetition level for uplink |
|---|---|---|
| 0 | 0% * max = 0 dB | 0% * max = 0 dB |
| 1 | 20% * max 3 dB | 20% * m x = 3 dB |
| 2 | 20% * max 3 dB | 50% * max = 7.5 dB |
| 3 | 50% * max = 7.5 dB | 50% * max = 7.5 dB |
| 4 | 50% * max = 7.5 dB | 80% * max = 12 dB |
| 5 | 80% * max = 12 dB | 80% * max = 12 dB |
| 6 | 80% * max = 12 dB | 100% * max = 15 dB |
| 7 | 100% * max = 15 dB | 100% * max = 15 dB |

The MTC UE may only send offsets, not directly indicating the repetition levels. The MTC UE may indicate uplink or downlink using one of the three bits (for example, 0=uplink and 1=downlink) and increase or decrease the repetition level of the corresponding downlink/uplink using the remaining 2 bits (e.g., 01=increase, 10=decrease). For example, when the MTC UE has transmitted RLI=101, the eNB may read the MSB of 1 to determine the corresponding information to indicate downlink and interpret the remaining 01 to increase the downlink repetition level. The degree of increase may be predefined or may be transmitted from the eNB to the UE through signaling such as RRC. Alternatively, increase/decrease of the repetition level on uplink/downlink may be defined in a table.

TABLE 17

| RLI | Repetition level for downlink | Repetition level for uplink |
|---|---|---|
| 0 | 0 | 0 |
| 1 | +5 | 0 |
| 2 | 0 | +5 |
| 3 | +5 | +5 |
| 4 | −5 | 0 |
| 5 | 0 | −5 |

TABLE 17-continued

| RLI | Repetition level for downlink | Repetition level for uplink |
|---|---|---|
| 6 | −5 | −5 |
| 7 | +10 | +1 |

In this case, the MTC UE may transmit RLI=101 to signal that the repetition level on downlink remains unchanged, and the repetition level on uplink is changed by −5 dB.

This method also includes a case of using values that may be derived from RLI through an equation in a one-to-one manner.

Meanwhile, there should be agreement or sharing between the eNB and the MTC UE on whether to perform the conventional CSI feedback or to feed back information about coverage enhancement according to Method 1-3 proposed above. Methods of determining the coverage enhancement level of a UE agreed in the current LTE standard are described below.

Method 1: The coverage enhancement level of the UE is determined by a physical random access channel (PRACH) repetition level mapped to a PRACH resource set selected in the successful RACH procedure.

In this case, the UE assumes that the PRACH repetition level mapped to the PRACH resource set that the UE has selected in the RACH procedure is the coverage enhancement level thereof, without separate signaling. Thus, if the UE needs to use the coverage enhancement, it may perform channel measurement and feedback using Method 1-3 proposed above. Otherwise, the UE may perform conventional channel measurement and feedback. In particular, such determination of the coverage enhancement level may be used to determine the initial reporting method after cell access of the UE since it may be used to determine the initial coverage enhancement level in the cell access procedure of the UE.

Method 2: The eNB may semi-statically set the coverage enhancement level of the UE for the UE via higher layer signaling (e.g., RRC signaling).

In this case, if the UE needs to use coverage enhancement according to the RRC signaling received from the eNB, the UE may perform channel measurement and feedback using Method 1-3 proposed above. Otherwise, the UE may perform conventional channel measurement and feedback. This configuration may be used especially in reconfiguring the coverage enhancement level of the UE, and thus may be used when the feedback method needs to be changed in the midst of operation. At this time, when the eNB indicates the coverage enhancement level of the UE through RRC signaling or the like, the coverage enhancement level of the UE may be determined based on the reporting result of the UE described above.

The UE may determine the coverage enhancement level to report based on the measurement result thereof. This operation may be based on radio resource measurement (RRM) or Channel State Information (CSI). In the case where the operation is based on RRM, the UE may report shift from the current coverage enhancement level to a higher coverage enhancement level if the measurement result exceeds a certain reference, and may report shift from the current coverage enhancement level to a lower coverage enhancement level if the measurement result is lower than a certain reference. In the case where the operation is based on CSI, the UE may report shift from the current coverage enhancement level to a higher coverage enhancement level if the CQI measured by the UE satisfies a certain criterion (for example, 16QAM for 5 subframes). The UE may report shift from the current coverage enhancement level to a lower coverage enhancement level if the CQI level measured by the UE is 0 (out of band).

Here, the reporting method to be used by the UE may be explicitly indicated by the eNB through signaling such as RRC signaling or may be implicitly indicated in a manner of setting the coverage enhancement level through such signaling. The eNB receiving the report on the coverage enhancement level of the UE may perform data transmission to each UE using a coverage enhancement technique (e.g., repeated transmission, frequency hopping, etc.) according to the coverage enhancement level.

Method 2: Deactivating the RI Instance

As a method in which definition of the transmission instance of the RI is used, the MTC UE may send a PUSCH that is intended to be transmitted in the corresponding instance, or other CSI feedback. In this case, the RI configuration that the eNB is to transmit through signaling such as RRC may not be transmitted to the MTC UE.

Method 3: New Feedback Mode

In order to avoid RI feedback, a feedback mode used by a rank-limited UE (i.e., MTC UE) may be redefined as follows. In this case, the eNB should explicitly or implicitly signal a corresponding feedback mode to the MTC UE (to allow the UE to use, for example, a transmission mode to which the feedback mode is connected).

Feeding back only PMI and CQI

As in Method 2, this mode is a feedback mode in which only PMI and CQI are transmitted without RI transmission.

In TM 9 or 10, W1, W2 and CQI may be transmitted through 8 CSI-RS ports.

The MTC UE may use a feedback mode for transmitting a specific long-term PMI, a short-term PMI, and a CQI as in Method 1-2. In this case, the priority level described in Method 1-2 may be used to configure a drop rule between CSIs whose transmission instances overlap.

Alternatively, the MTC UE may use a feedback mode in which W1, W2 and CQI are transmitted in one transmission instance.

The eNB may inform the MTC UE of a feedback mode for the UE to use through higher layer signaling such as RRC. The MTC UE may operate by selecting one of two feedback modes according to signaling from the eNB.

In the legacy LTE-A system, when CSI feedback is performed on a subband basis using Feedback mode 2-1, the UE transmits a precoding type indicator (PTI) together with the RI to inform the eNB of switch to wideband/subband feedback. If the RI transmission instance is removed, the MTC UE may transmit a PTI with other CSI to inform the eNB of switch to the broadband/subband feedback. FIGS. 10 and 11 illustrate an exemplary case in which the PTI is transmitted together with the W2 and CQI to signal switch to the broadband/subband feedback.

FIG. 10 illustrates transmission of a first PMI W1 of a long term wideband, a second PMI W2 of a short term wideband, and CQI. FIG. 11 illustrates transmission of the second PMI W2 and CQI of a long term wideband and the second PMI W2 and CQI of a short term subband. In these examples, the PTI is transmitted together with the second PMI W2 and CQI of wideband which are transmitted in common. In this case, a new feedback type may be defined as follows.

Type X: WB W2+CQI+PTI

In Type X above, W2 is 4 bits, and CQI is 4 bits (1 codeword only), so 1 bit of PTI may be added to a total of 11 bits to enter 11 bit payload of PUCCH. For the case of the example of FIG. 11, a new priority level may be defined considering subbands.

Long Term PMI>Short Term PMI/CQI and Wideband CSI>Sub-band CSI

Namely,

Type 2a: WB W1

When Types 2, 2b, 2c, 4, and X are defined as:

Type 2: WB CQI+WB PMI

Type 2b: WB CQI+WB W2

Type 2c: WB W1+WB W2+WB CQI

Type 4: WB CQI

Type X: WB W2+CQI+PTI.

Type 2a has a higher priority than Types 2, 2b, 2c, 4, and X. When Types 1 and 1a are defined as:

Type 1: SB CQI

Type 1a: SB CQI+SB W2,

Types 2, 2b, 2c, 4, and X have a higher priority than Types 1 and 1a.

The eNB and the MTC UE determine a drop rule when the CSI transmission instances overlap according to the priority order described above. The MTC UE transmits CSI according to the drop rule, and the eNB determines and analyzes the information included in the CSI in the corresponding instance according to the drop rule.

Depending on whether PTI is 0 or 1, each instance determines which period/offset to select. For example, if PTI=0, the second PMI W2 of wideband and CQI may use the period/offset corresponding to the short term. If PTI=1, the long term period/offset used by W1 when PTI=0 may be used.

In addition, when the CQI of the CSI is calculated, the coverage enhancement effect may be considered. In particular, a low cost MTC UE may perform frequency hopping in poor radio environments (e.g., basements, warehouses, etc.), which may be considered. When a coverage enhancement UE attempts to raise the coverage level by means of repeated transmission or the like, the UE may reduce repetitions of transmission through diversity gain if the band for repeated transmission changes over time. Thereby, performance and battery life may be enhanced. As described above, when frequency hopping is supported, CSI measurement and feedback are preferably performed in a subband supporting frequency hopping of the UE. In this case, CSI feedback may be performed as follows.

Performing CSI measurement and feedback on each subband in which frequency hopping is performed: For example, if a UE desires to transmit data by performing frequency hopping between subbands A and B, the UE measures and feeds back the CSI for subbands A and the CSI for subband B. In this case, since the UE transmits the CSI of each subband, the eNB determines the CSI of the UE by referring to the CSI transmitted for each subband.

Performing one CSI measurement and feedback for all subbands in which frequency hopping is performed: In this case, the UE may calculate and report one CQI/PMI value for all subbands in which frequency hopping is performed. Here, a CSI reference resource for measuring the CSI may be individually specified for the corresponding subband. Alternatively, the UE may generate a single CQI/PMI value by estimating the channel of each subband using the most recently measured CRS or CSI-RS of the corresponding subband.

As the number of frequency hopping subbands increases, performance of estimation of the CSI for the MTC UE may be deteriorated. The MTC UE needs to carry out measurement by shifting its own operating frequency through frequency retuning in order to measure channels of other sub-bands. In this case, time for retuning is required. If the number of frequency hopping subbands increases, the time taken to move between subbands increases, resulting in decrease in accuracy of the initially measured channel information. In this case, channel estimation is performed for each subband, but the channel information reporting assumes a situation in which an integrated CQI is reported to the eNB for all the subbands.

Additionally, if the CSI feedback is repeatedly transmitted, the CSI estimation performance may be further degraded. If one CSI is repeatedly transmitted 10 times, for example, the eNB uses CSI given before a time corresponding to 10 transmissions because it can use the corresponding CSI only after 10 transmissions of the CSI. This results in a deteriorated channel measurement result. Further, since other CSI cannot be transmitted for the corresponding time, the period of channel measurement is increased, which also results in lowered channel measurement performance.

Therefore, the UE may use a measurement report for reporting the reference signal received power (RSRP)/reference signal received quality (RSRQ) instead of the aperiodic CSI feedback. To this end, the UE may transmit information about the CQI/PMI in a measurement report for reporting RSRP and/or RSRQ. Here, the information about the CQI/PMI may be the MCS index of the CQI table or the PMI index of the PMI table. Alternatively, the UE may transmit information about the downlink coverage level/number of repetitions. In this case, the eNB may determine the number of repeated transmissions (e.g., when the coverage level is fed back), the MCS level (e.g., when the coverage level/number of repetitions is fed back)

It is also possible to feed back RSRP and/or RSRQ instead of RI when other information is to be fed back in place of the RI as described above. This information may be used for the eNB to determine the coverage level.

The coverage level determined above is designated to the UE through signaling such as RRC or the UE determines the coverage level and performs a coverage enhancement operation such as repeated transmission.

Figure 12:
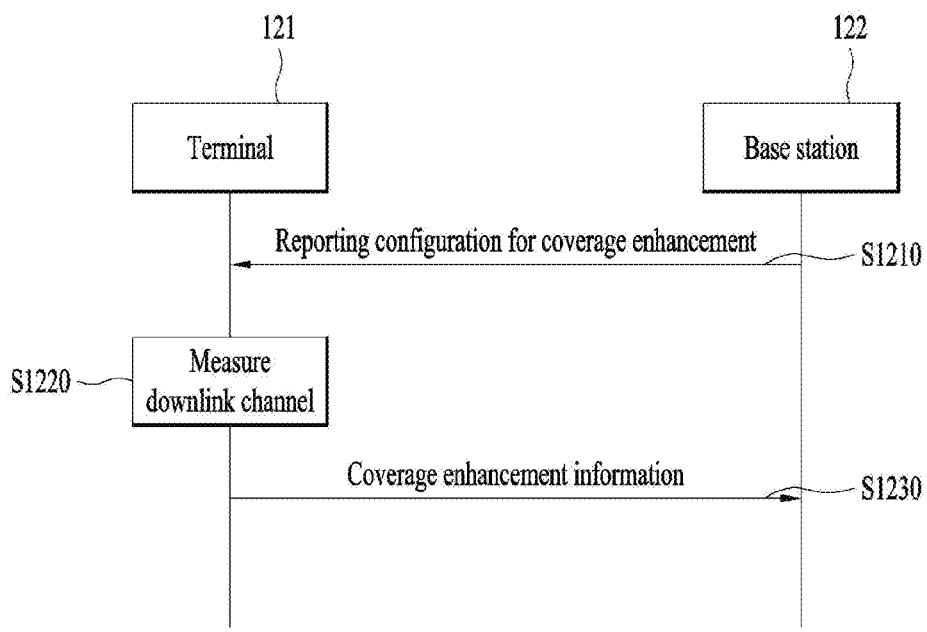
FIG. 12 illustrates operations according to an embodiment of the present invention.

FIG. 12 illustrates operations according to an embodiment of the present invention.

This embodiment relates to a rank-limited UE performing feedback related to a downlink channel in a wireless communication system.

The UE may measure a downlink channel (S1210). Then, the UE may feed back information for coverage enhancement based on the measured value of the downlink channel (1220). The information for coverage enhancement may include a repetition level indicator for coverage enhancement.

In addition, the information for coverage enhancement may be transmitted in an instance for transmission of a rank indicator configured for the UE.

The information for coverage enhancement may include a repetition level indicator for downlink and a repetition level indicator for uplink.

The information for coverage enhancement may also include a repetition level indicator for an individual physical channel.

In addition, the repetition level indicator may include a repetition level for coverage enhancement or a repetition level offset for coverage enhancement.

If the feedback of the information for coverage enhancement conflicts with feedback of the channel state information, feedback of the channel state information may be dropped.

Figure 13:
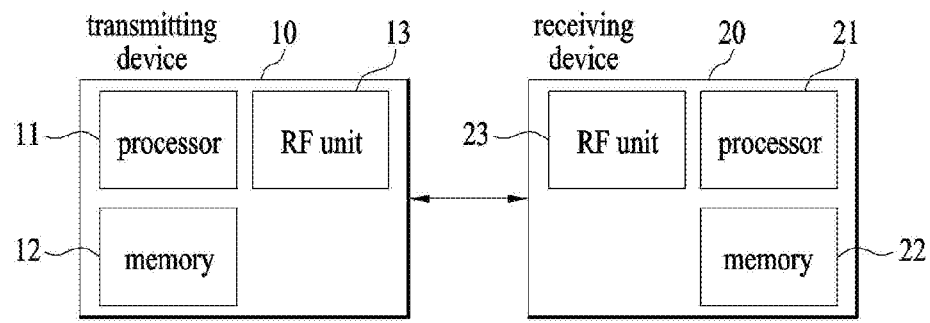
FIG. 13 is a block diagram illustrating apparatuses for implementing embodiment(s) of the present invention.

FIG. 13 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for performing reporting of information for coverage enhancement by a rank-limited terminal in a wireless communication system, the method comprising:
   receiving a reporting configuration of the information for coverage enhancement;
   measuring a downlink channel based on the reporting configuration; and
   reporting the information for coverage enhancement determined based on a value of the measured downlink channel,
   wherein the information for coverage enhancement includes a repetition level indicator for coverage enhancement,
   wherein the information for coverage enhancement is transmitted in a transmission instance for a rank indicator configured for the terminal, and
   wherein the information for coverage enhancement has a higher priority than channel state information to be reported by the terminal.

2. The method according to claim 1, wherein the information for coverage enhancement comprises further includes a repetition level indicator for downlink and a repetition level indicator for uplink.

3. The method according to claim 1, wherein the information for coverage enhancement further includes a repetition level indicator for an individual physical channel.

4. The method according to claim 1, wherein the repetition level indicator includes a repetition level for coverage enhancement or a repetition level offset for coverage enhancement.

5. The method according to claim 1, wherein a reporting of channel state information is dropped when the reporting of the information for coverage enhancement collides with reporting of the channel state information.

6. The method according to claim 1, further comprising:
receiving downlink data transmitted using a coverage enhancement technique according to the information for coverage enhancement.

7. The method according to claim 1, wherein the reporting of the information for coverage enhancement is included and transmitted in a measurement report for a reference signal received power (RSRP) or a reference signal received quality (RSRQ).

8. A rank-limited terminal configured to perform reporting of information for coverage enhancement, the terminal comprising:
a radio frequency (RF) unit; and
a processor configured to control the RF unit,
wherein the processor is configured to:
receive a reporting configuration of the information for coverage enhancement;
measure a downlink channel according to the reporting configuration; and
report the information for coverage enhancement determined based on a value of the measured downlink channel,
wherein the information for coverage enhancement includes a repetition level indicator for coverage enhancement, and
wherein the information for coverage enhancement is transmitted in a transmission instance for a rank indicator configured for the terminal, and
wherein the information for coverage enhancement has a higher priority than channel state information to be reported by the terminal.

9. The terminal according to claim 8, wherein the information for coverage enhancement further includes a repetition level indicator for downlink and a repetition level indicator for uplink.

10. The terminal according to claim 8, wherein the information for coverage enhancement further includes a repetition level indicator for an individual physical channel.

11. The terminal according to claim 8, wherein the repetition level indicator includes a repetition level for coverage enhancement or a repetition level offset for coverage enhancement.

12. The terminal according to claim 8, wherein a reporting of channel state information is dropped when reporting of the information for coverage enhancement collides with reporting of the channel state information.

13. The terminal according to claim 8, wherein the processor is configured to receive downlink data transmitted using a coverage enhancement technique according to the information for coverage enhancement.

14. The terminal according to claim 8, wherein the reporting of the information for coverage enhancement is included and transmitted in a measurement report on a reference signal received power (RSRP) or a reference signal received quality (RSRQ).

* * * * *